United States Patent
Hsu

(10) Patent No.: US 8,526,545 B1
(45) Date of Patent: *Sep. 3, 2013

(54) PHASE SHIFT KEYING WIRELESS COMMUNICATION APPARATUS AND METHOD

(75) Inventor: Yungping Hsu, Saratoga, CA (US)

(73) Assignee: Marvell International Ltd., Hamilton (BM)

(*) Notice: Subject to any disclaimer, the term of this patent is extended or adjusted under 35 U.S.C. 154(b) by 223 days.

This patent is subject to a terminal disclaimer.

(21) Appl. No.: 13/170,027

(22) Filed: Jun. 27, 2011

Related U.S. Application Data

(60) Continuation of application No. 12/437,090, filed on May 7, 2009, now Pat. No. 7,970,079, which is a division of application No. 11/511,044, filed on Aug. 28, 2006, now Pat. No. 7,539,266, which is a continuation of application No. 10/183,814, filed on Jun. 26, 2002, now Pat. No. 7,106,803.

(51) Int. Cl.
*H04L 27/06* (2006.01)
*H04L 23/00* (2006.01)
*H04J 3/04* (2006.01)

(52) U.S. Cl.
USPC .................. 375/340; 375/377; 370/543

(58) Field of Classification Search
USPC ............ 375/224, 225, 260, 316, 340, 377; 370/252, 253, 542, 543
See application file for complete search history.

(56) References Cited

U.S. PATENT DOCUMENTS

| | | | |
|---|---|---|---|
| 5,159,282 A | 10/1992 | Serizawa et al. | |
| 5,982,807 A | 11/1999 | Snell | |
| 6,075,812 A | 6/2000 | Cafarella et al. | |
| 6,590,889 B1 | 7/2003 | Preuss et al. | |
| 6,647,077 B1 | 11/2003 | Shan et al. | |
| 6,819,677 B1 | 11/2004 | Nouzovsky et al. | |
| 6,904,272 B2 | 6/2005 | Hitomi et al. | |
| 7,106,803 B1 | 9/2006 | Hsu | |
| 7,263,119 B1 | 8/2007 | Hsu et al. | |
| 2001/0002199 A1* | 5/2001 | Hershey et al. | 370/505 |
| 2001/0054060 A1 | 12/2001 | Fillebrown et al. | |
| 2001/0055351 A1 | 12/2001 | Malkemes et al. | |
| 2004/0097207 A1 | 5/2004 | Sandaralingam | |
| 2005/0220186 A1 | 10/2005 | Kohyama | |

OTHER PUBLICATIONS

Jan M. Rabaey, Wireless Beyond the Third Generation—Facing the Energy Challenge BWRC, EECS Department, ISLPED '01, Aug. 6-7, 2001, Huntington Beach, California, USA, pp. 1-3.

(Continued)

*Primary Examiner* — Tesfaldet Bocure

(57) ABSTRACT

A baseband processor including an analog to digital converter configured to convert a baseband signal from an analog format into a corresponding digital format, wherein the baseband signal comprises a data packet having i) a preamble portion, ii) a header portion, and iii) a payload portion, wherein the payload portion of the data packet is in accordance with either i) a first format or ii) a second format. The baseband processor further includes a first demodulation pathway configured to recover i) the preamble portion of the data packet, ii) the header portion of the data packet, and iii) the payload portion of the data packet in response to the payload portion of the data packet being of the first format; and a second demodulation pathway configured to recover the payload portion of the data packet in response to the payload portion of the data packet being of the second format.

14 Claims, 4 Drawing Sheets

(56) References Cited

OTHER PUBLICATIONS

IEEE std. 802.11 b—1999, Sponsor LAN MAN Standards Committee of IEEE Computer Society, "Part 11: Wireless LAN Medium Access Control (MAC) and Physical Layer (PHY) Specifications, Higher Speed Physical Layer Extension in 2.4 GHz Band," Ch. 18 (pp. 11-58).

ANSI/IEEE std. 802.11 b—1999 Edition, Sponsor LAN MAN Standards Committee of IEEE Computer Society, "Part 11: Wireless LAN Medium Access Control (MAC) and Physical Laver (PHY) Specifications," Ch. 12 (pp. 138-146), Ch. 13 (pp. 147), Ch. 15 (pp. 195-223).

\* cited by examiner

PHASE SHIFT KEYING WIRELESS COMMUNICATION APPARATUS AND METHOD

CROSS-REFERENCE TO RELATED APPLICATIONS

This present disclosure is a continuation of U.S. application Ser. No. 12/437,090, filed on May 7, 2009, which is a divisional of U.S. application Ser. No. 11/511,044 (now U.S. Pat. No. 7,539,266), filed on Aug. 28, 2006, which is a continuation of U.S. application Ser. No. 10/183,814 (now U.S. Pat. No. 7,106,803), filed on Jun. 26, 2002.

TECHNICAL FIELD

This invention is generally directed to communications technology, and is particularly concerned with systems and techniques for high effective throughput wireless data communications using phase shift keying ("PSK") modulation.

BACKGROUND

The past few years has witnessed the ever-increasing availability of relatively cheap, low power wireless data communication services, networks and devices, promising near wire speed transmission and reliability. One technology in particular, described in the IEEE Standard 802.11b-1999 Supplement to the ANSI/IEEE Standard 802.11, 1999 edition, collectively incorporated herein fully by reference, and more commonly referred to as "802.11b" or "WiFi", has become the darling of the information technology industry and computer enthusiasts alike as a wired LAN/WAN alternative because of its potential 11 Mbps effective throughput, ease of installation and use, and transceiver component costs make it a real and convenient alternative to wired 10 BaseT Ethernet and other cabled data networking alternatives. With 802.11b, workgroup-sized networks can now be deployed in a building in minutes, a campus in days instead of weeks since the demanding task of pulling cable and wiring existing structures is eliminated. Moreover, 802.11b compliant wireless networking equipment is backwards compatible with the earlier 802.11 1M/2 Mbps throughput standard, thereby further reducing deployment costs in legacy wireless systems.

802.11b achieves relatively high payload data transmission rates or effective throughput via the use of orthogonal class modulation in general, and, more particularly, 8-chip complementary code keying ("CCK") and a 11 MHz chipping rate to bear the payload. As such, previously whitened or scrambled bitstream data of interest is mapped into nearly orthogonal sequences (or CCK code symbols) to be transmitted, where each chip of the CCK code symbol is quaternary phase modulated using QPSK ("quadrature phase shift keying") modulation techniques. Meanwhile the common phase of each CCK symbol is jointly determined by the current and previous symbols using differential QPSK or DQPSK modulation scheme. Subsequent conversion into the analog domain prepares these CCK symbols for delivery over a wireless medium RF modulated on a carrier frequency within the internationally recognized 2.4 GHz ISM band to form the payload or PLCP Service Data Unit of an 802.11b complaint Physical Layer Convergence Procedure ("PLCP") frame. The high-rate physical layer PLCP preamble and header portions are still modulated using the 802.11 compliant Barker spreading sequence at an 11 MHz chipping rate. In particular, the preamble (long format—144 bits, short format—72 bits) is universally modulated using DBPSK ("differential binary phase shift keying") modulation resulting in a 1 Mbps effective throughput, while the header portion may be modulated using either DBPSK (long preamble format) or DQPSK (short preamble format) to achieve a 2 Mbps effective throughput.

An IEEE 802.11b compliant receiver receives and down-converts an incident inbound RF signal to recover an analog baseband signal bearing the PLCP frame, and then digitizes and despreads this signal to recover the constituent PLCP preamble, header and payload portions in sequence. The preamble and header portions are Barker correlated and then either DBPSK or DQPSK demodulated based on the preamble format used to recover synchronization data and definitional information concerning the received PLCP frame, including the data rate (Signal field in the PLCP header) and octet length (Length field in the PLCP header) of the variable-length payload or PSDU portion. The CCK encoded symbols forming the PLCP payload portion are each correlated against 64 candidate waveforms in received per symbol sequence in combination with DQPSK demodulation to verify and reverse map each into the underlying bitstream data of interest, at either 4 bits per symbol (5.5 Mbps) or 8 bits per symbol (11 Mbps) increments.

The major benefit CCK offers is strong inherent resistance to multipath interference, which is likely to be encountered in in-building transceiver deployment. However, in an effort to match occupied channel bandwidth of legacy base 802.11 systems, 802.11b compliant CCK modulation uses the same 11 MHz chipping rate, thereby limiting effective throughput to a maximum 11 Mbps effective data throughput. While acceptable for some applications, this data rate is deemed too slow for certain "broadband" applications such as full-screen streaming video and interactive gaming. 802.11b's sibling communications scheme, defined in the 1999 IEEE 802.11a Supplement to the ANSI/IEEE Standard 802.11, 1999 edition ("802.11a") offers a higher effective throughput (up to 54 Mbps), but sacrifices backwards compatibility with 802.11b, and requires data transmission in the 5 GHz band which is not generally available outside North America. The forthcoming IEEE 802.11g high-rate PHY extension attempts to address 802.11a's backwards compatibility issue through specifying dual 802.11b and 802.11a compliant transceivers, but this adds cost, complexity and power consumption to the very price sensitive, consumer-oriented mobile devices which stand to benefit most from high speed wireless data communications.

Accordingly, it would be advantageous to define a wireless data communications scheme which economically increases effective throughput over 802.11b compliant devices while maintaining backwards compatibility with such devices, thereby fully leveraging the worldwide benefits of ISM transmission and a large installed base of 802.11b systems.

SUMMARY

The present invention is directed in part to a baseband processor and associated method suitable for use in a wireless transmitter. This processor and method utilizes packet header generation unit capable of generating a header portion of an outbound data packet, PSK modulation capable of PSK modulating the header portion at a first effective throughput and PSK modulating outbound data at a second effective throughput to form a PSK modulated payload (in which the second effective throughput is at least five times the first effective throughput), symbol modulation capable of symbol modulating the outbound data at a third effective throughput to form a symbol modulated payload (in which the third effective throughput being less than the second effective throughput), and modulation selection capable of selecting one of the PSK modulated payload and the symbol modulated payload to form a payload portion of the outbound data packet.

In accordance with an embodiment of the invention, a common PSK modulation arrangement may be provided to economically handle both header and payload modulation. In an alternative embodiment, dedicated modulation units may be provided, if for example, a single PSK modulation arrangement provides unacceptable performance.

Further, one or more disclosed embodiments make use of the DQPSK form of PSK modulation to increase effective throughput at least twice that of the third effective throughput where symbol modulation utilizes orthogonal class symbol modulation such as CCK modulation. As such, a DQPSK modulator may be selectively clocked at the CCK chipping rate to achieve such effective throughput.

The present invention is also directed in part to a baseband processor and associated method suitable for use in a wireless receiver. Such processor and method includes header demodulation capable of recovering of a header portion of an inbound data packet, along with packet demodulation capable of 1) recovering first data at a first effective throughput from the payload portion of the data packet according to a symbol demodulation scheme; 2) recovering second data from this payload portion at a second effective throughput exceeding the first effective throughput according to a PSK demodulation scheme; and 3) selecting one of the first and second data as inbound data presented in the payload portion of the inbound data packet based on the recovered header portion thereof. Thus, for example, backwards compatibility may be maintained with legacy 802.11b devices while still providing enhanced throughput demodulation capabilities.

In accordance with an embodiment of the invention, first data recovery is performed using symbol correlation, including orthogonal class symbol correlation such as CCK correlation. Moreover, PSK demodulation here may include utilizing DQPSK demodulation.

The present invention is further directed in part to a data packet including a header portion defining first PSK modulated data having a first effective throughput, and a payload portion proceeding such header portion, in which the payload portion includes, based on said header portion, either second PSK modulated data having a second effective throughput at least five times the first effective throughput or symbol modulated data having a third effective throughput, the third effective throughput being less than the second effective throughput. In accordance with an embodiment, this data packet may further include a DBPSK modulated preamble, and the PSK modulated data may include DQPSK modulated data having an effective throughput of at least 22 Mbps.

Additional aspects and advantages of this invention will be apparent from the following detailed description of embodiments thereof, which proceeds with reference to the accompanying drawings.

DETAILED DESCRIPTION

Figure 1:
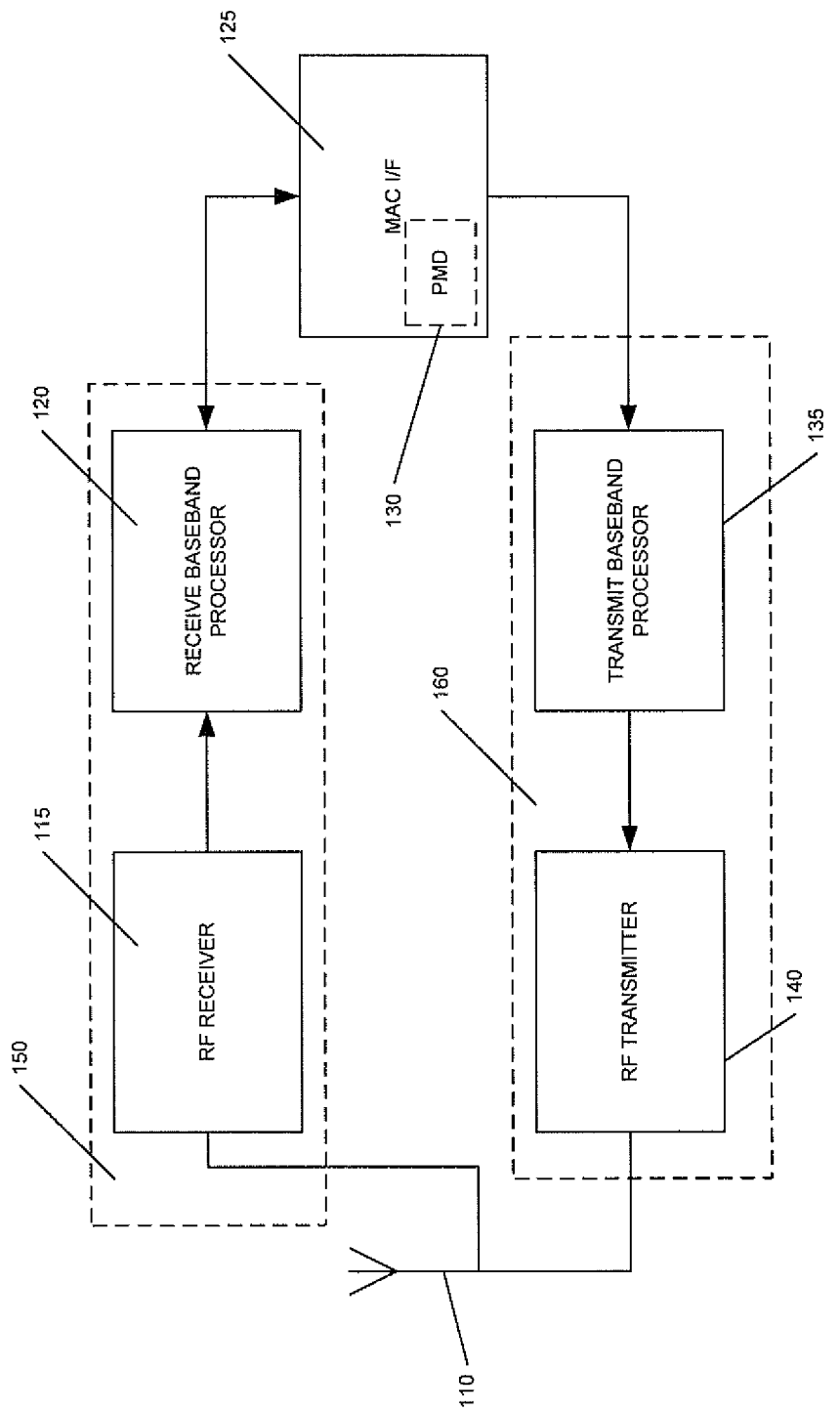
FIG. 1 is a simplified block diagram of a transceiver according to an embodiment of the present invention.

Turning now to the FIGs., FIG. 1 illustrates a wireless communications transceiver 100 according to an embodiment of the invention. In this embodiment, inbound RF signals conveying a 802.11b compliant PLCP frame and/or a data packet formatted in accordance with the data packet format 400 shown in FIG. 4 ("22 Mbps compatible data packet") are picked up by the duplex antenna 110 and routed to the RF receiver unit 115 of a receiver 150 arranged in a manner consistent with the present invention. The RF receiver unit 115 performs routine downconversion and automatic gain control of the inbound RF signals, and presents an analog baseband signal containing the aforementioned 802.11b PLCP frame or data packet to the receive baseband processor 120. The functions of the receive baseband processor 120 will be detailed below with reference to FIG. 3, including selective demodulation of the analog baseband signal to recover a 22 Mbps effective throughput inbound data bitstream from the payload of a received 22 Mbps compatible data packet. Generally speaking, however, the receive baseband processor 120 performs symbol correlation and/or demodulation of the preamble, header and payload portions of each inbound 802.11b PLCP frame or 22 Mbps compatible data packet to recover bitstream data for receiver synchronization (preamble), frame or packet definition (header), or the actual inbound data of interest (payload).

Once recovered by the receive baseband processor 120, the inbound data contained in the PSDU of each received 802.11b PLCP frame or the payload of the 22 Mbps compatible data packet is delivered to a network interface such as the MAC layer interface 125 and then on to higher layer applications and devices being serviced by the transceiver 100. Here, the MAC layer interface 125 differs from a conventional 802.11b MAC layer interface in that it can accommodate inbound data at a 22 Mbps maximum rate, and includes logic in its PMD sublayer 130 to recognize when the payload of an inbound 22 Mbps compatible data packet includes DQPSK modulated inbound data in its payload portion with an effective throughput of 22 Mbps. As will be discussed in greater detail below with reference to FIG. 4, the PMD sublayer may conveniently recognize this high rate DQPSK mode through interpretation of a 22 Mbps transmission rate in the Signal field 415 (e.g. 0xDC) as well setting a previously reserved bit in the Service field 420 of the inbound 22 Mbps compatible data packet which are recovered prior to the start of actual payload symbol demodulation.

Outbound data intended for wireless transmission originating from the device(s) or application(s) being serviced by the transceiver 100 are delivered to the transmit baseband processor 135 of the transmitter 160 from the MAC interface 125. As before, the PMD sublayer 130 differs from a conventional PMD sublayer in that it can direct that outbound data be delivered to the transmit baseband processor 135 at a 22 Mbps transmission rate, and that the MAC interface 125 can selectively perform such transfer responsive to such directive or decision made by the PMD sublayer 130. Directives from the PMD sublayer 130 expressing the desired transmission mode, including the 802.11b 1, 2, 5.5 and 11 Mbps effective throughput modes as well as the inventive 22 Mbps DQPSK mode are transferred to the transmit baseband processor as well for each PLCP frame/packet, including the HI_SPEED semaphore discussed in greater detail with respect to FIG. 2. The transmit baseband processor 135 formulates appropriate 802.11b PLCP frame or inventive data packet preamble and header information, and symbol encodes the outbound data as specified by the PMD 130 to generate a complete outbound 802.11b PLCP frame or data packet formatted in accordance with the data packet format 400 of FIG. 4. As the frame or packet is being developed, it is converted into analog form suitable for upconversion and RF transmission by the RF transmitter unit 140 consistent with 802.11b physical layer requirements.

Though not shown in FIG. 1, the transceiver 100 may form an operational part of a network interface apparatus such as a PC card or network interface card capable of interfacing with the CPU or information processor of an information processing apparatus such as a desktop or laptop computer, and may be integrated within and constitute a part of such information processing apparatus. This network interface apparatus may alternatively form an operational component of a wireless communications access point such as a base station as will be appreciated by those ordinarily skilled in the art.

Figure 2:
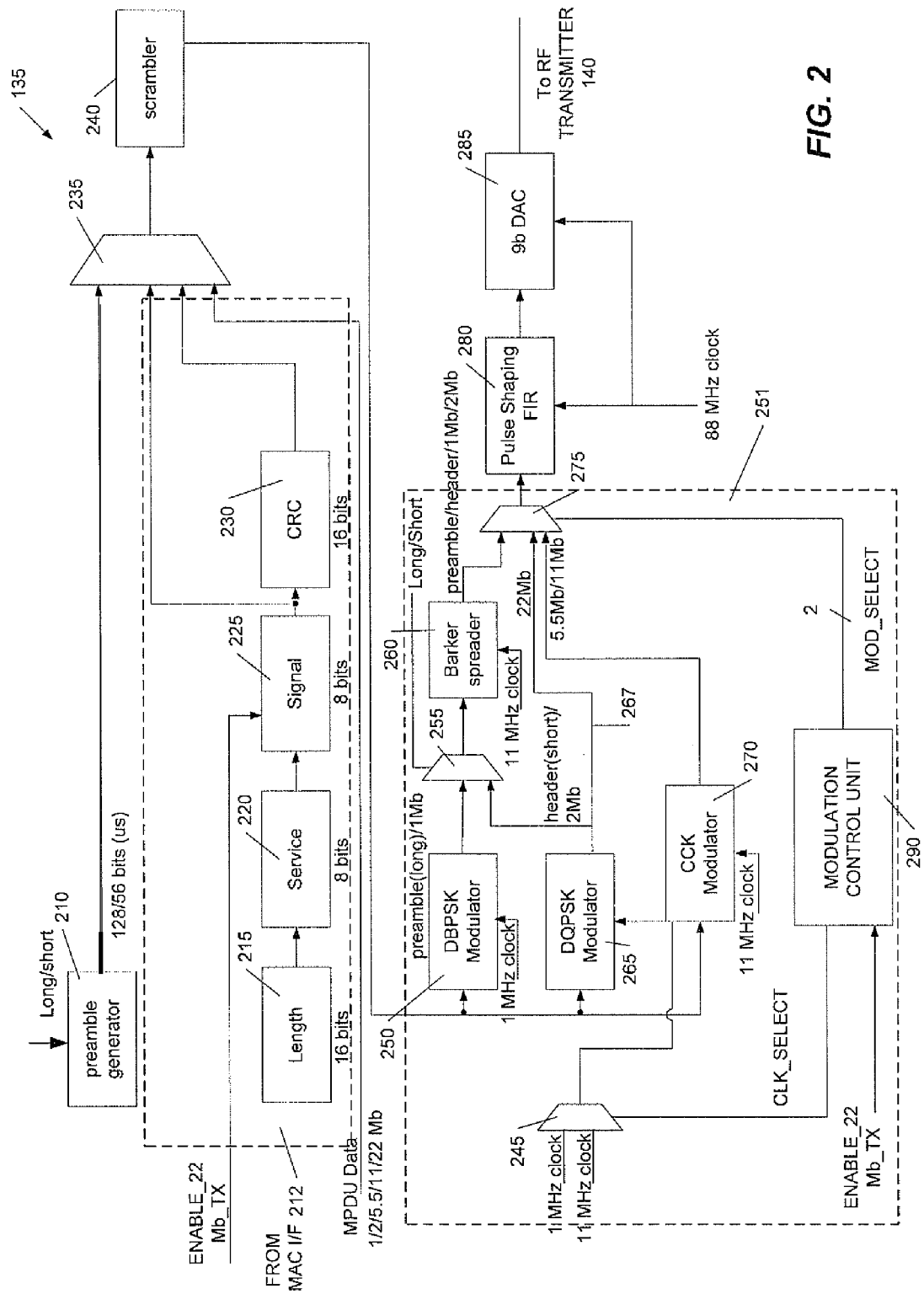
FIG. 2 is a more detailed block diagram of a transmit baseband processor shown in FIG. 1.

Turning now to FIG. 2, FIG. 2 is a more detailed block diagram of the transmit baseband processor 135 shown in FIG. 1. So as not to obfuscate the teachings of the present invention, several 802.11b compliant directives and signals are not shown. Outbound data in the form of MPDU packets are sent by the MAC 125 at either 802.11b compliant 1, 2, 5.5 or 11 Mbps selectable transmission rates/modes matching the effective throughput of the outbound PLCP frame, as well as 22 Mbps in the DQPSK transmission mode of the present embodiment. The preamble and header portions of the outbound 802.11b frame are generated by the preamble generator 210 and the header generator 212, which includes separate Length field 215, Service field 220, Signal field 225 and CRC 230 generation units corresponding to the fields constituting the header of the 802.11b PLCP frame or 22 Mbps compatible data packet. Once generated, the preamble, header and CRC (part of the header) are sequenced in frame order by the mux 235, followed by the outbound MPDU data, which then undergoes routine scrambling/whitening using known techniques to optimize it for wireless transmission.

In contrast with a conventional 802.11b compliant header generation unit, the header generation unit 212 and the Signal generation unit 225 in particular includes logic capable of interpreting an ENABLE_22 Mb_TX semaphore managed by the PMD 130 indicating whether or not the current frame/packet will be transmitted in 22 Mbps DQPSK mode in accordance with the present embodiment. If, for example, ENABLE_22 Mb_TX is false, the Signal generation unit 225 will insert the appropriate 802.11b compliant data rate into the Signal field of the outbound PLCP frame. However, consistent with the data packet format 400 shown in FIG. 4, if ENABLE_22 Mb_TX is true, the 22 Mbps DQPSK mode is selected and so the Signal generation unit 225 will insert 0xDC (220 in hexadecimal notation) into the Signal field 415 of the outbound data packet. Though not shown in FIG. 2, in addition to or in the alternative, the Service generation unit 220 may include logic capable of setting at least one heretofore reserved bit in the Service field 420 to indicate that the payload 435 arranged in accordance with the 22 Mbps DQPSK mode. More detail on the data packet format 400 will be provided below with reference to FIG. 4.

Once generated, the scrambled preamble, header and payload portions defining a current outbound PLCP frame or 22 Mbps compatible data packet are serially presented to the symbol encoding unit 251, here shown containing a DBPSK modulation pathway (including DBPSK modulator 250, mux 255 and Barker spreader 260) for preamble encoding and parallel DQPSK (DQPSK modulator 265, mux 255 and the Barker spreader 260, with the DQPSK modulator 265 being clocked at 1 MHz e.g. the CLK_SELECT semaphore is clear) and DBPSK modulation pathways for short/long header encoding respectively. These modulation pathways are used to encode the outbound data received from the MAC interface 125 when legacy base 802.11 1 Mbps (using the DBPSK modulator pathway) and 2 Mbps (using the DQPSK modulation pathway) transmission rates/modes are desired. For 5.5 and 11 Mbps rates compliant with 802.11b, a CCK modulator 270 is used clocked at the 11 MHz chipping rate.

When it is desired to transmit the outbound data at an effective throughput 22 Mbps, thereby doubling the 802.11b 11 Mbps maximum, in accordance with this embodiment, the 11 MHz chipping clock is applied to the DQPSK modulator 265. Since each DQPSK sample can encode 2 bits of outbound data, this results in a 22 Mbps throughput. The 11 MHz clock is applied through the modulation control unit perceiving the HI_SPEED semaphore from the PMD sublayer 130 as being set and consequently setting the CLK_SELECT signal to a logic level (e.g. true) directing the mux 245 to direct the 11 MHz clock to the clock input of the DQPSK modulator 265 as it received the scrambled outbound data. Line 267 communicatively couples the output of the DQPSK modulator to the modulation selection mux 275 to complete the 22 Mbps mode DQPSK modulation pathway.

The modulation control unit 290 drives the MOD_SELECT signal, which is used in conjunction with the conventional long/short signal to have mux 255 and mux 275 select which of the four possible modulation pathways described above should be used to develop the symbol encoded preamble, header and payload of the outbound 802.11b PLCP frame or 22 Mbps compatible data packet. For example, when generating an 11 Mbps mode 802.11b PLCP frame, the modulation control unit asserts e.g. "00" to select the DBPSK pathway to generate the symbol encoded preamble 410 and the PLCP header 440 (if a short preamble is desired, the DBPSK pathway is used only for the short preamble, and the mux 255 selects the DQPSK modulator 265 output when clocked to 1 MHz to develop the symbol encoded PLCP header). As such, the modulation control unit 290 will then assert e.g. "10" on the MOD_SELECT line during the payload portion part of the PLCP frame generation sequence to deliver CCK modulated outbound data to the FIR 280, digital-to-analog converter or DAC 285, and onto the RF transmitter unit 140.

If, however, a 22 Mbps compatible data packet is to be transmitted, the modulation control unit 290 instead asserts e.g. "01" on the MOD_SELECT line during the payload portion part of the data packet generation sequence to select output from the 22 Mbps DQPSK modulation pathway to deliver DQPSK modulated symbols at 11 MHz to the FIR 280 and DAC 285.

Though the present embodiment contemplates a dual role, dual clocked DQPSK modulator 265, in fact in an alternative embodiment, separate DQPSK modulators (1 clocked at 1 MHz, the other clocked at 11 MHz) may be provided to undertake the necessary DQPSK modulation activities specified herein.

Figure 3:
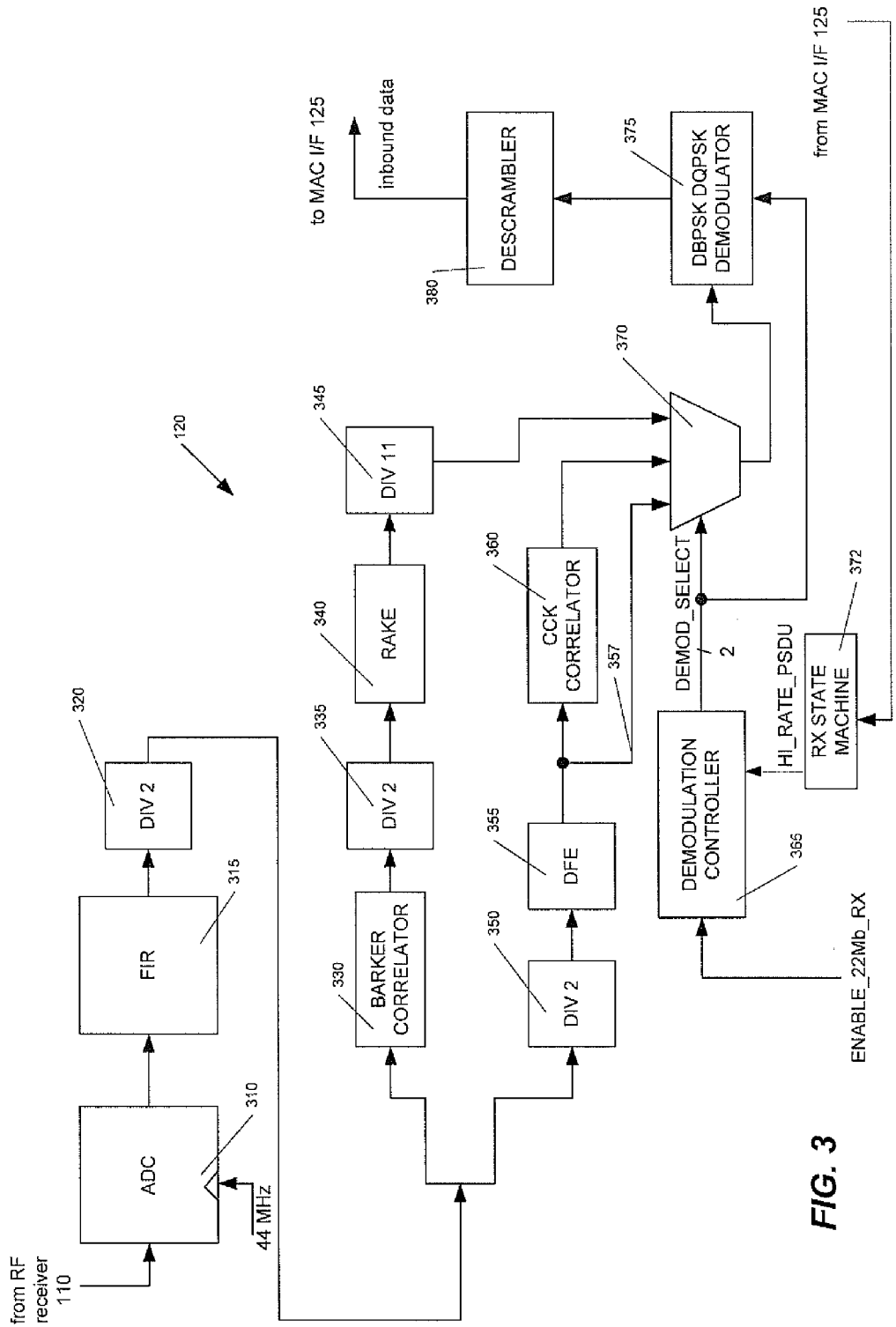
FIG. 3 is a more detailed block diagram of a receive baseband processor shown in FIG. 1.

Turning now to FIG. 3, FIG. 3 is a more detailed block diagram of the receive baseband processor 120 shown in FIG. 1. As such, an analog baseband signal conveying an inbound 802.11b PLCP frame or 22 Mbps compatible data packet recovered by the RF receiver unit 110 of the receiver 150 is fed to the input of the analog to digital converter 310 to convert it into digital form. With the aid of the 44 MHz clock, the ADC produces a corresponding digital signal sampled at 44 MHz. Next, this digital signal passes through the digital FIR LPF 315 to reject out-of-band interference, and the down sampler 320 to provide a 22 MHz digital signal bearing the frame/packet of interest.

This 22 MHz signal next encounters two parallel baseband demodulation pathways. The first demodulation pathway, including the Barker correlator 330, down sampler 335, Rake 340 and the down sampler 345 is used to recover a despread 1 MHz signal representing the preamble and header portions of the inbound frame or data packet for symbol demodulation by the combination DBPSK/DQPSK demodulator 375. This first demodulation pathway-demodulator combination 375 is also used for symbol decoding a base 802.11 PLCP frame payload in 1 Mbps/2 Mbps modes. The second demodulation pathway is used to symbol demodulate a high rate 802.11b payload portion of the inbound frame as well as the 22 Mbps DQPSK mode modulated payload for an inbound 22 Mbps compatible data packet, and includes a 22 MHz to 11 MHz down sampler 350 following by a decision feedback equalizer 355. To begin the CCK symbol decode process for 802.11b compliant payloads at 11 Mbps or 5.5 Mbps transmission modes, a CCK correlator 360 is provided. It should be noted that, in addition, a parallel pathway 357 that bypasses this correlator 360 is provided to deliver a 22 Mbps DQPSK modulated payload directly to the DBPSK/DQPSK demodulator 375.

A demodulation controller 365 is used to control which demodulation pathway should be used via the DEMOD_SELECT control line coupled to the control element mux 370, based on which portion of the inbound frame or packet is being demodulated, as well whether 5.5 Mbps+ payload modulation modes are specified. To this end, the demodulation controller bases its DEMOD_SELECT decision based on the conventional HI_RATE PSDU semaphore, generated by the known rx state machine 372 in conjunction with appropriate signaling issued by the MAC interface 125, which determines whether the 802.11b high rate PHY transmission modes are specified, along with the inventive ENABLE_22 Mb_RX semaphore (set if 22 Mbps DQPSK mode according to the present invention is specified). Though not required, in this embodiment, the ENABLE_22 Mb_RX semaphore is managed as a register within the MAC I/F 125 by the PMD sublayer 130. The combination DBPSK/DQPSK demodulator 375 is used to recover the symbol encoded inbound data presented in the preamble, header and payload portions, including the 22 Mbps payload mode consistent with the present invention. The DBPSK/DQPSK demodulator is clocked at the symbol rate; i.e., 1 MHz for 1 Mb and 2 Mb modes, and 1.375 MHz for 5.5 Mb and 11 Mb modes, and 11 MHz for 22 Mb mode.

After symbol demodulation, the recovered inbound data is descrambled by the descrambler 380 in a known fashion, and delivered to the MAC interface 125 (FIG. 1).

Figure 4:
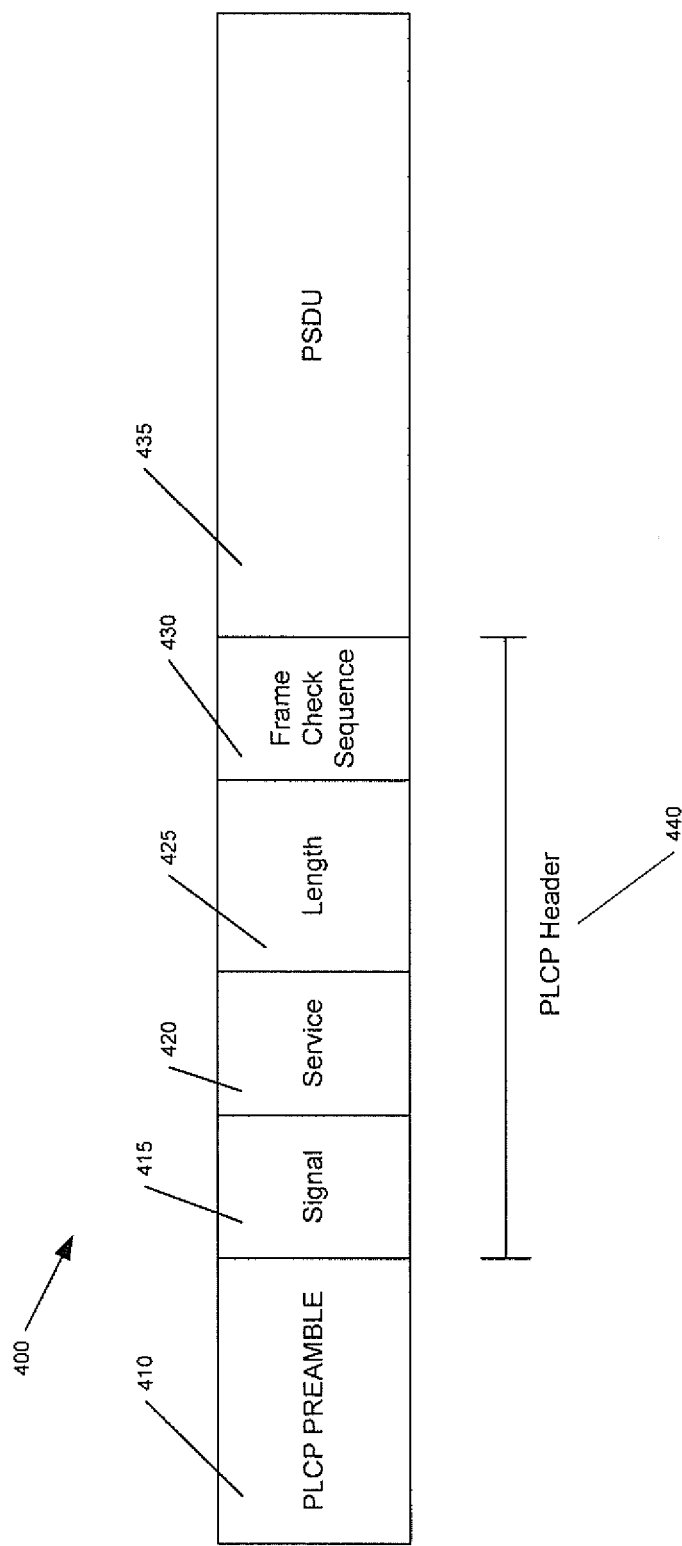
FIG. 4 diagrammatically illustrates a data packet format in accordance with the embodiment of FIG. 1.

FIG. 4 illustrates the data packet format 400 used by the transceiver 100 of FIG. 1 to support the 22 Mbps DQPSK transmission mode, in addition to 802.11b and base 802.11 modes. To this end, the data packet format 400 specifies an 802.11b compliant PLCP preamble portion 410 and can support either long or short formats. The next portion, the PLCP header 440, includes an 8 bit Signal field 415, 8 bit Service field 420, 16 bit Length field 425, and 8 bit Frame check sequence 430. Like the 802.11b compliant PLCP header, the header portion 440 can be transmitted at 1 Mbps (DBPSK modulation at 1 MHz) or 2 Mbps (DQPSK modulation at 1 MHz) effective throughput. Moreover, in this embodiment, the Signal field 415 differs from an 802.11b compliant Signal field only in that it is additionally capable of specifying the 22 Mbps data rate 0xDC or 220 in hexadecimal notation. Though not required, one or more heretofore reserved bits in the Service field 420 are used in this embodiment to indicate that the payload 435 is modulated in accordance with the above-described 22 Mbps mode.

The Length 425 and Frame Check Sequence 430 fields are formatted in accordance with corresponding fields in the 802.11b compliant PLCP header. The PSDU 435 contains the payload modulated in accordance with one of the legacy 802.11b modes (1/2/5.5/11 Mbps) or the 22 Mbps mode consistent with the present invention as specified in the Signal 415 and/or Service 420 fields.

Thus, this data packet format 400 is backwards compatible with the base 802.11 and 802.11b standards, and would only deviate from the standard 802.11 and 802.11b PLCP frame formats only where the 22 Mbps DQPSK transmission mode according to the present embodiment is selected. Furthermore, a legacy 802.11b device would, upon decoding and interpretation of the Signal 415 and Service 420 fields, consider an inbound packet formatted in accordance with packet format 400 as an unrecognizable, illegal or garbled 802.11b packet, or possibly even as interference and would thus ignore the packet. The 22 Mbps transmitter would then back-off to legacy 802.11b CCK 11/5.5 Mbps modes in a known manner to retransmit the data of interest.

It will be obvious to those having skill in the art that many changes may be made to the details of the above-described embodiments of this invention without departing from the underlying principles thereof. The scope of the present invention should, therefore, be determined only by the following claims.

What is claimed is:

1. A baseband processor comprising:
    an analog to digital converter configured to convert a baseband signal from an analog format into a corresponding digital format, wherein the baseband signal comprises a data packet having i) a preamble portion, ii) a header portion, and iii) a payload portion, wherein the payload portion of the data packet is in accordance with either i) a first format or ii) a second format, and wherein the second format is associated with a higher data rate than the first format;
    a parallel demodulation pathway configured to receive the baseband signal in the corresponding digital format, wherein the parallel demodulation pathway includes
    a first demodulation pathway configured to recover
        i) the preamble portion of the data packet,
        ii) the header portion of the data packet, and
        iii) the payload portion of the data packet in response to the payload portion of the data packet being of the first format; and
    a second demodulation pathway configured to recover the payload portion of the data packet in response to the payload portion of the data packet being of the second format.

2. The baseband processor of claim 1, wherein the data packet is compliant with IEEE Standard 802.11b.

3. The baseband processor of claim 1, wherein:
    a data rate of the first format corresponds to 11 Mbps; and
    a data rate of the second format corresponds to 22 Mbps.

4. The baseband processor of claim 1, further comprising a demodulator configured to demodulate the payload portion of the data packet in the first format or the second format.

5. A transceiver comprising the baseband processor of claim 1.

6. A network interface apparatus comprising the transceiver of claim 5.

7. The network interface apparatus of claim 6, wherein the network transceiver apparatus comprises a PC card or a network interface card.

8. An information processing apparatus comprising the network interface apparatus of claim 7.

9. The information processing apparatus of claim 8, wherein the information processing apparatus comprises a laptop computer or a desktop computer.

10. A method comprising:

converting a baseband signal from an analog format into a corresponding digital format, wherein the baseband signal comprises a data packet having i) a preamble portion, ii) a header portion, and iii) a payload portion, wherein the payload portion of the data packet is in accordance with either i) a first format or ii) a second format, and wherein the second format is associated with a higher data rate than the first format; and recovering, in a first demodulation pathway,
 i) the preamble portion of the data packet,
 ii) the header portion of the data packet, and
 iii) the payload portion of the data packet in response to the payload portion of the data packet being of the first format; and recovering, in a second demodulation pathway, the payload portion of the data packet in response to the payload portion of the data packet being of the second format.

11. The method of claim 10, wherein the first demodulation pathway is separate from the second demodulation pathway.

12. The method of claim 10, wherein the data packet is compliant with IEEE Standard 802.11b.

13. The method of claim 10, wherein:

a data rate of the first format corresponds to 11 Mbps; and a data rate of the second format corresponds to 22 Mbps.

14. The method of claim 10, further comprising demodulating the payload portion of the data packet in the first format or the second format.

* * * * *